United States Patent
Yoshitomi et al.

(10) Patent No.: US 11,831,048 B2
(45) Date of Patent: Nov. 28, 2023

(54) FUEL CELL SYSTEM

(71) Applicant: HONDA MOTOR CO., LTD., Tokyo (JP)

(72) Inventors: Ryoichi Yoshitomi, Wako (JP); Yuta Hoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/670,618

(22) Filed: Feb. 14, 2022

(65) Prior Publication Data

US 2022/0302479 A1    Sep. 22, 2022

(30) Foreign Application Priority Data

Mar. 22, 2021    (JP) .................................. 2021-047416

(51) Int. Cl.
*H01M 8/04119* (2016.01)
*H01M 8/04746* (2016.01)
*H01M 8/04082* (2016.01)

(52) U.S. Cl.
CPC ... *H01M 8/04156* (2013.01); *H01M 8/04201* (2013.01); *H01M 8/04761* (2013.01); *H01M 2250/20* (2013.01)

(58) Field of Classification Search
CPC ......... H01M 8/04156; H01M 8/04201; H01M 8/04761; H01M 2250/20; H01M 8/04; H01M 8/04089
See application file for complete search history.

(56) References Cited

U.S. PATENT DOCUMENTS

| 7,604,890 B2 | 10/2009 | Numata et al. |
| 8,268,496 B2 * | 9/2012 | Ogawa ................ H01M 8/0432 429/429 |
| 2006/0040158 A1 * | 2/2006 | Numata .................. F01N 3/005 429/513 |

FOREIGN PATENT DOCUMENTS

| JP | 2006-318821 A | 11/2006 |
| JP | 2006-344471 A | 12/2006 |
| JP | 2017-157317 A | 9/2017 |

OTHER PUBLICATIONS

Office Action dated Jan. 10, 2023 issued over the corresponding Japanese Patent Application No. 2021-047416 with the English translation thereof.

* cited by examiner

*Primary Examiner* — Stewart A Fraser
(74) *Attorney, Agent, or Firm* — Carrier, Shende & Associates P.C.; Joseph P. Carrier; Jeffrey T. Gedeon

(57) ABSTRACT

A fuel cell system including an exhaust merging unit at which a cathode exhaust fluid containing water discharged from a cathode of a fuel cell stack merges with an anode exhaust fluid containing water discharged from an anode of the fuel cell stack, wherein the exhaust merging unit includes a cathode exhaust outlet for discharging the cathode exhaust fluid, an anode exhaust outlet for discharging the anode exhaust fluid, and a partition separating the cathode exhaust outlet and the anode exhaust outlet on an upstream side of a merging section at which the cathode exhaust outlet and the anode exhaust outlet merge.

9 Claims, 5 Drawing Sheets

US 11,831,048 B2

FUEL CELL SYSTEM

CROSS-REFERENCE TO RELATED APPLICATIONS

This application is based upon and claims the benefit of priority from Japanese Patent Application No. 2021-047416 filed on Mar. 22, 2021, the contents of which are incorporated herein by reference.

BACKGROUND OF THE INVENTION

Field of the Invention

The present invention relates to a fuel cell system for merging and discharging a cathode off-gas and an anode exhaust fluid.

Description of the Related Art

A fuel cell generates electric power by electrochemical reactions between a fuel gas (e.g., hydrogen gas) supplied to an anode and an oxygen-containing gas (e.g., compressed air) supplied to a cathode. Water is produced by the chemical reactions. Most of the produced water is discharged from the fuel cell system along with the oxygen-containing exhaust gas (cathode off-gas). A part of the produced water moves in the electrolyte membrane to the anode. Therefore, the fuel exhaust gas (anode off-gas) also contains water.

The anode off-gas containing water is separated into condensed water and gas phase components by a gas-liquid separator. The anode off-gas containing a large amount of condensed water separated by the gas-liquid separator (hereinafter referred to as an anode exhaust fluid) flows into the exhaust merging unit and merges with the cathode off-gas. The anode exhaust fluid is discharged to the outside of the fuel cell system after having merged with the cathode off-gas (for example, JP 2017-157317 A).

SUMMARY OF THE INVENTION

However, there is a concern that the water in the cathode off-gas may flow back to the anode or the water in the anode exhaust fluid may flow back to the cathode, from the exhaust merging unit.

Accordingly, it is an object of the present invention to provide a fuel cell system capable of preventing backflow of water from the exhaust merging unit.

One aspect of the following disclosure is a fuel cell system including an exhaust merging unit at which a cathode exhaust fluid containing water discharged from the cathode of a fuel cell stack merges with an anode exhaust fluid containing water discharged from the anode of the fuel cell stack, wherein the exhaust merging unit includes a cathode exhaust outlet for discharging the cathode exhaust fluid, an anode exhaust outlet for discharging the anode exhaust fluid, and a partition separating the cathode exhaust outlet and the anode exhaust outlet on an upstream side of a merging section at which the cathode exhaust outlet and the anode exhaust outlet merge.

The fuel cell system of the above aspect prevents backflow of water from the exhaust merging unit.

The above and other objects, features and advantages of the present invention will become more apparent from the following description when taken in conjunction with the accompanying drawings in which a preferred embodiment of the present invention is shown by way of illustrative example.

DESCRIPTION OF THE INVENTION

Hereinafter, preferred embodiments of the fuel cell system will be described in detail with reference to the accompanying drawings.

Figure 1:
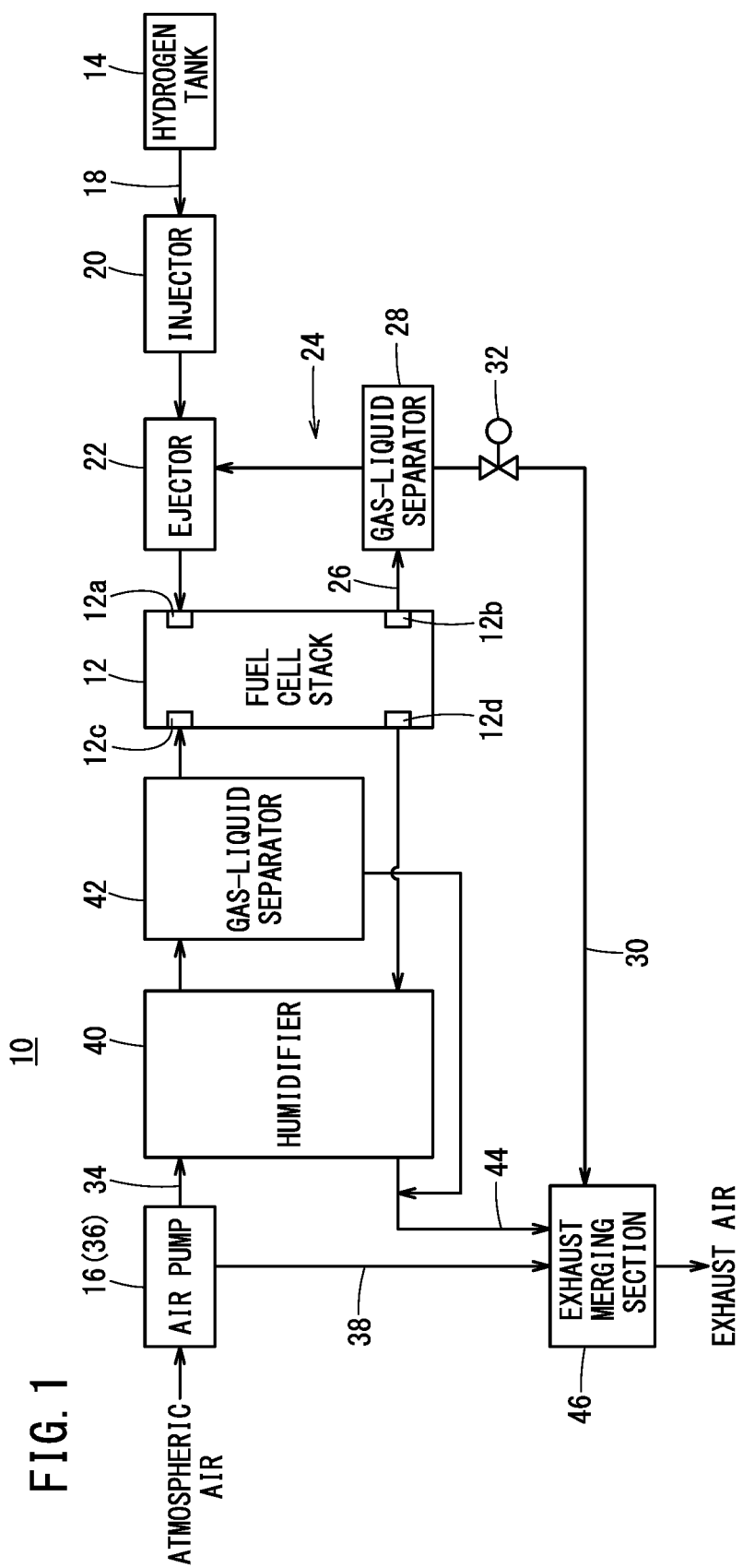
FIG. 1 is a schematic diagram of a fuel cell system according to an embodiment.

As shown in FIG. 1, a fuel cell system 10 according to the present embodiment includes a fuel cell stack 12 (fuel cell). The fuel cell stack 12 includes a fuel gas supply device 14 for supplying a fuel gas, and an oxygen-containing gas supply device 16 for supplying an oxygen-containing gas. In the present embodiment, hydrogen gas is used as the fuel gas and compressed air is used as the oxygen-containing gas.

The fuel cell stack 12 has a plurality of power generating cells stacked one another. Each of the power generation cells is formed by sandwiching the membrane electrode assembly between a pair of separators. The membrane electrode assembly includes a solid polymer electrolyte membrane. The solid polymer electrolyte membrane is formed, for example, by impregnating a thin membrane of perfluorosulfonic acid with water, or of a thin membrane of a hydrocarbon system. The solid polymer electrolyte membrane has an anode and a cathode on both sides. One of the separators has, on a surface facing the anode, a hydrogen gas flow field (fuel gas flow field) for supplying and discharging hydrogen gas to and from the anode. The other of the separators has, on a surface facing the cathode, an air flow field (oxygen-containing gas flow field) for supplying and discharging air to and from the cathode.

The fuel cell stack 12 includes a hydrogen gas inlet 12a, a hydrogen gas outlet 12b, an air inlet 12c, and an air outlet 12d. The hydrogen gas inlet 12a penetrates in the stacking direction of the power generation cells and communicates with the supply side of the hydrogen gas flow field. The hydrogen gas outlet 12b penetrates in the stacking direction of the power generation cells and communicates with the discharge side of the hydrogen gas flow field. The air inlet 12c penetrates in the stacking direction of the power generation cells and communicates with the supply side of the air flow field. The air outlet 12d penetrates in the stacking direction of the power generation cells and communicates with the discharge side of the air flow field.

The fuel gas supply device 14 includes, for example, a hydrogen tank for storing high-pressure hydrogen gas. The fuel gas supply device 14 is connected to the hydrogen gas inlet 12a of the fuel cell stack 12 through a hydrogen gas supply path 18. The hydrogen gas is supplied to the fuel cell stack 12 through the hydrogen gas supply path 18.

An injector 20 and an ejector 22 are provided in series in the hydrogen gas supply path 18. When the inside of the ejector 22 becomes negative pressure, the ejector 22 draws hydrogen gas from a hydrogen circulation channel 24.

A hydrogen gas discharge path 26 is connected to the hydrogen gas outlet 12b of the fuel cell stack 12. A hydrogen exhaust gas (anode off-gas) that is left over after having been used at the anode, is guided to the hydrogen gas discharge path 26 from the fuel cell stack 12.

A gas-liquid separator 28 is connected to the hydrogen gas discharge path 26. The gas-liquid separator 28 separates the anode off-gas containing a large amount of water into an anode exhaust fluid containing a large amount of condensed water and a hydrogen gas obtained after separating the condensed water. The anode exhaust fluid contains hydrogen gas as well as water in the liquid phase. The hydrogen circulation channel 24 is connected to the gas-liquid separator 28. The hydrogen gas separated by the gas-liquid separator 28 flows into the hydrogen circulation channel 24. The downstream side of the hydrogen circulation channel 24 is connected to the ejector 22. A discharge flow path 30 for discharging the anode exhaust fluid is connected to the bottom of the gas-liquid separator 28. The anode exhaust fluid separated by the gas-liquid separator 28 is discharged through the discharge flow path 30. A drain valve 32 is provided along the discharge flow path 30.

The oxygen-containing gas supply device 16 introduces, compresses and feeds atmospheric air (air) to an air supply path 34. In this embodiment, the oxygen-containing gas supply device 16 includes an air pump 36. The air pump 36 is configured as a compressor incorporating a motor serving as a rotary drive means in order to compress and supply atmospheric air (air). That is, as the motor rotates, the air pump 36 compresses the atmospheric air to generate compressed air. The air pump 36 supplies compressed air to the fuel cell stack 12 through an air supply path 34.

The air supply path 34 is connected to the air inlet 12c of the fuel cell stack 12 on the downstream side of the air pump 36. A humidifier 40 and a gas-liquid separator 42 are disposed along the air supply path 34.

An air discharge path 44 is connected to the air outlet 12d of the fuel cell stack 12. The air discharge path 44 discharges, from the fuel cell stack 12, the cathode off-gas, which is the compressed air left over after having been used at the cathode. In the cathode, a large amount of water is produced in accordance with the electrochemical reactions of the power generation cell. The water produced at the cathode is discharged from the fuel cell stack 12 together with the cathode off-gas. That is, the cathode off-gas contains a large amount of water.

The air discharge path 44 has the humidifier 40. The humidifier 40 exchanges water and heat between the compressed air supplied from the air pump 36 and the cathode off-gas. Further, the air discharge path 44 has an exhaust merging unit 46 downstream of the humidifier 40. The exhaust merging unit 46 is connected to the downstream end of the discharge flow path 30.

The air pump 36 generates heat as the air is compressed. A part of the compressed air is used for thermal regulation such as for cooling of the motor and various devices, to meet the operation conditions of the motor and various devices. The part of the compressed air after having been used for the regulation of the various devices (hereinafter referred to as balance air) is discharged through a regulation flow path 38 connected to the air pump 36. The downstream side of the regulation flow path 38 is connected to the exhaust merging unit 46. The balance air is merged with the cathode off-gas and the anode exhaust fluid at the exhaust merging unit 46.

Figure 2:
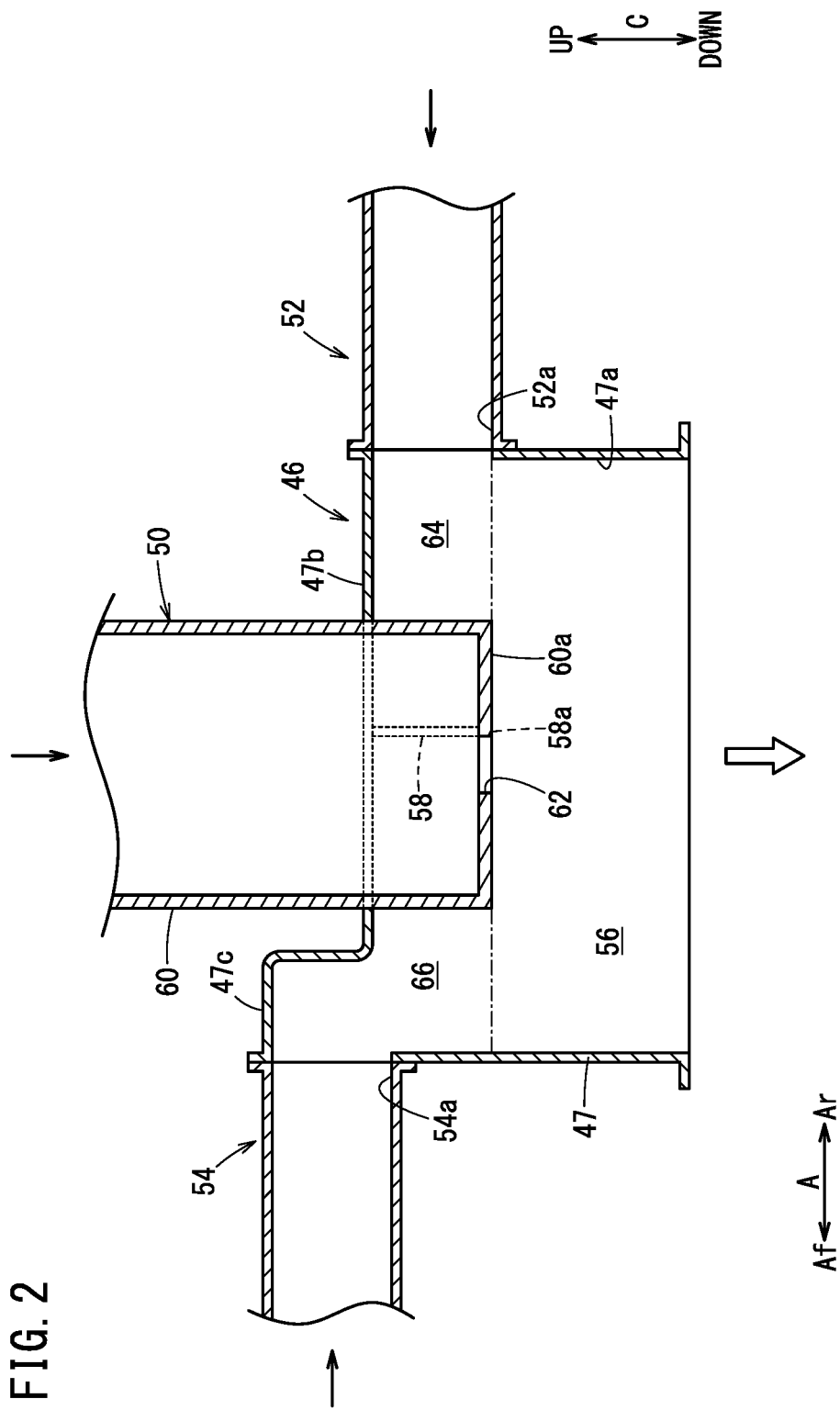
FIG. 2 is a cross-sectional view of the front side of the exhaust merging unit of FIG. 1.
Figure 3:
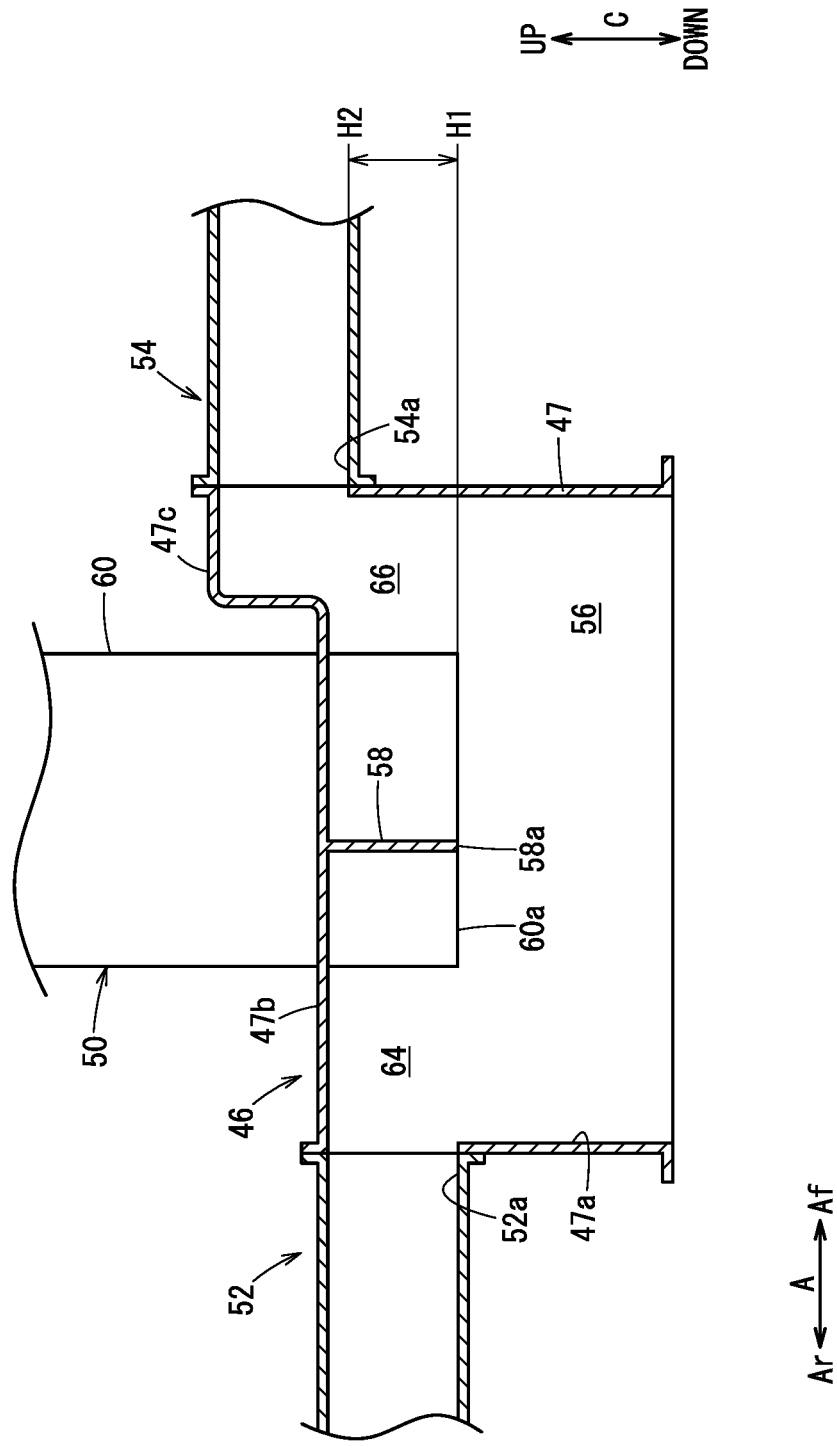
FIG. 3 is a cross-sectional view of the back side of the exhaust merging unit of FIG. 1.

As shown in FIGS. 2 and 3, the exhaust merging unit 46 includes a cylindrical main body portion 47, a cathode exhaust outlet 50, an anode exhaust outlet 52, a regulation flow outlet 54, a merging section 56 at which fluids flowing out from these outlets merge, and a partition 58.

The main body portion 47 has a cylindrical shape extending in the direction of the arrow C which is the vertical direction in the installed state. The main body portion 47 has a cavity 47a therein. The partition 58 is provided in the cavity 47a. A portion lower than the lower end 58a of the partition 58 in the cavity 47a is the merging section 56 in which the cathode off-gas, the anode exhaust fluid, and the balance air merge. The flow path cross-sectional area of the merging section 56 of the main body portion 47 is larger than the sum of the cross-sectional area of an orifice 62 (to be described later) of the cathode exhaust outlet 50, the cross-sectional area of the anode exhaust outlet 52, and the cross-sectional area of the regulation flow outlet 54.

The upper portion of the cavity 47a includes a discharge space 64 for the anode exhaust fluid and a discharge space 66 for the regulating flow. The discharge space 64 for the anode exhaust fluid is a region adjacent to the opening of the anode exhaust outlet 52. The discharge space 66 for the regulation flow is a region adjacent to the opening of the regulation flow outlet 54. The partition 58 separates the discharge space 64 for the anode exhaust fluid from the discharge space 66 for the regulation flow.

The cathode exhaust outlet 50 is connected to the downstream of the air discharge path 44 in FIG. 1. As shown in FIG. 2, the cathode exhaust outlet 50 protrudes downward from the upper end 47b of the main body portion 47 toward the cavity 47a. The cathode exhaust outlet 50 has a tubular portion 60 extending in the direction of the arrow C, which is the vertical direction in the installed state. The cathode off-gas flows along the tubular portion 60.

The orifice 62 communicating with the merging section 56 opens at the lower end 60a of the tubular portion 60. The cathode off-gas is discharged through the orifice 62 to the merging section 56. The cross-sectional area of the orifice 62 is smaller than that of the tubular portion 60. The lower end 60a of the tubular portion 60 having the orifice 62 is positioned at substantially the same level as the lower end 58a of the partition 58 in the vertical direction. The tubular portion 60 functions as a partition for separating the cathode off-gas from the fluid in the anode exhaust outlet 52 and the fluid in the regulation flow outlet 54.

As shown in FIG. 3, the anode exhaust outlet 52 is connected to the main body portion 47 at a side portion near the upper end 47b. The anode exhaust outlet 52 is open in the direction indicated by the arrow A (the lateral direction in the installed state). The lower end 52a of the anode exhaust outlet 52 is positioned at substantially the same level as or a higher level than the lower end 60a of the tubular portion 60 (and the lower end 58a of the partition 58). In the illustrated example, the anode exhaust outlet 52 is oriented so as to face the outer wall of the tubular portion 60. The layout of the anode exhaust outlet 52 is not limited to the illustrated example, and the axial line of the anode exhaust outlet 52 may be offset from the tubular portion 60.

The upper end 47b of the main body portion 47 has an expanded portion 47c that expands upward. The regulation flow outlet 54 is connected to the expanded portion 47c of the main body portion 47. The regulation flow outlet 54 is open in the direction indicated by the arrow A (the lateral direction in the installed state). The regulation flow outlet 54 is open at a position higher than the opening of the anode exhaust outlet 52. In the present embodiment, the position H2 of the lower end 54a of the regulation flow outlet 54 is higher than the position H1 of the lower end 60a of the tubular portion 60 of the cathode exhaust outlet 50 (and the lower end 58a of the partition 58). Further, the regulation flow outlet 54 and the anode exhaust outlet 52 are disposed on opposite sides of the main body portion 47 with the central axis of the exhaust merging unit 46 interposed therebetween.

The partition 58 protrudes downward from the upper end 47b of the main body portion 47. The partition 58 is disposed between the regulation flow outlet 54 and the anode exhaust outlet 52. One end of the partition 58 is connected to a side wall of the main body 47. The other end of the partition 58 is connected to the tubular portion 60. The lower end 58a of the partition 58 extends to the same level as the lower end 60a of the tubular portion 60. The partition 58 separates the upper portion of the merging section 56 of the exhaust merging unit 46 into the space communicating with the regulation flow outlet 54 and the space communicating with the anode exhaust outlet 52.

The fuel cell system 10 of the present embodiment is configured as described above. Hereinafter, the operation of the exhaust merging unit 46 will be described.

Figure 4:
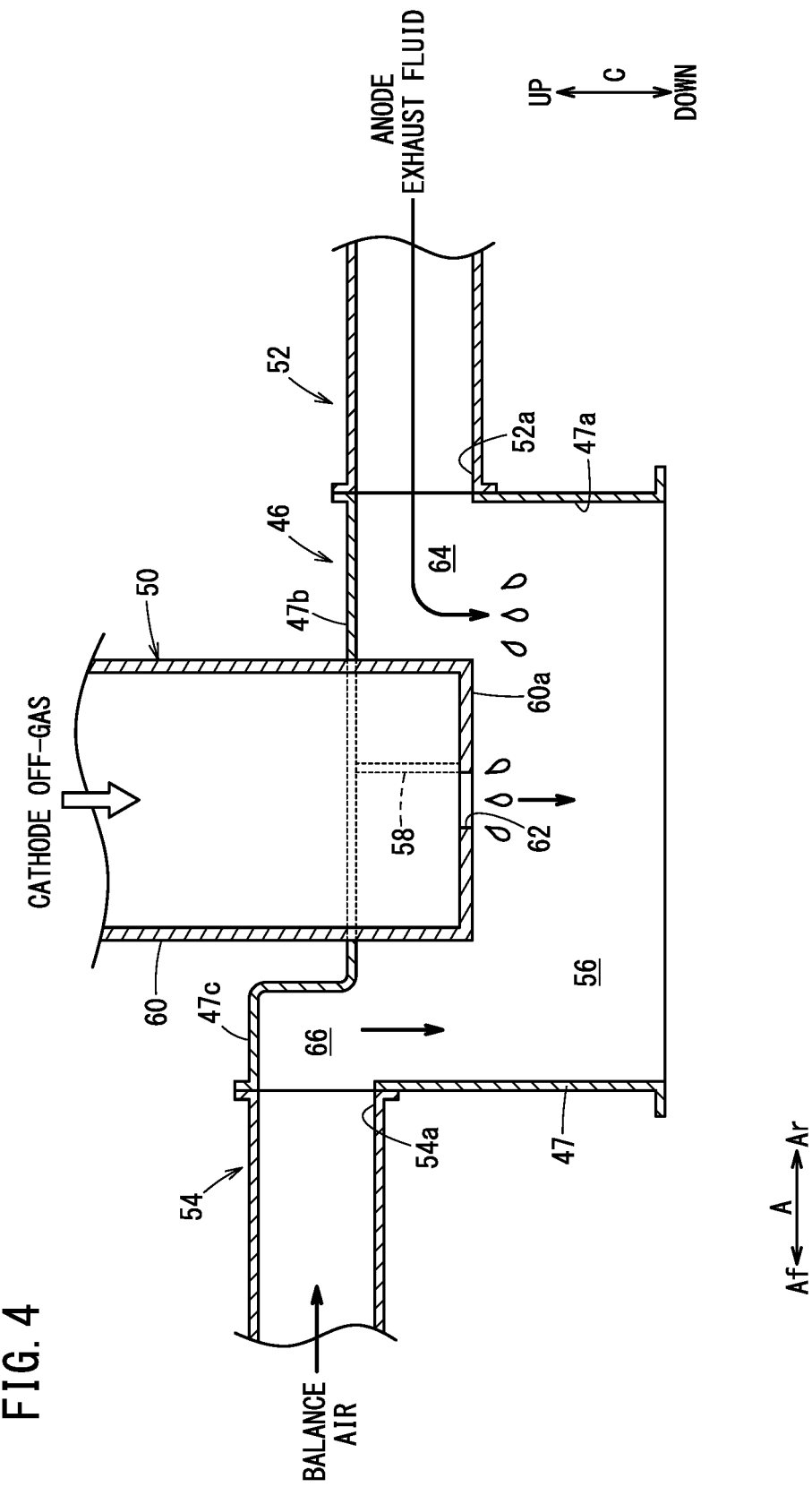
FIG. 4 is an explanatory view showing the operation of the exhaust merging unit shown in FIGS. 2 and 3.

As shown in FIG. 4, the cathode off-gas containing a large amount of water is discharged to the exhaust merging unit 46 through the cathode exhaust outlet 50. The cathode off-gas is discharged through the orifice 62 to the merging section 56 having a cross-sectional area larger than that of the cathode exhaust outlet 50. The cathode off-gas at the cathode exhaust outlet 50 is throttled by the orifice 62. As a result, the internal pressure of the cathode exhaust outlet 50 becomes higher than that of the merging section 56. Therefore, it is possible to prevent the backflow of the cathode off-gas from the merging section 56 toward the cathode exhaust outlet 50.

The condensed water contained in the cathode off-gas is guided to the orifice 62 by the tubular portion 60 while being separated from the anode exhaust outlet 52 and the regulation flow outlet 54. The condensed water spurts from the orifice 62 to the merging section 56 together with the cathode off-gas. Therefore, it is possible to prevent the backflow of the condensed water in the cathode off-gas into the anode exhaust outlet 52 and the regulation flow outlet 54.

Further, the anode exhaust fluid flows into the exhaust merging unit 46 from the anode exhaust outlet 52. The anode exhaust fluid is discharged to the merging section 56 through the discharge space 64 for the anode exhaust fluid. The partition 58 separates the discharge space 64 for the anode exhaust fluid from the discharge space 66 for the regulation flow. Therefore, the partition 58 prevents the backflow of the condensed water contained in the anode exhaust fluid into the regulation flow outlet 54.

The balance air is discharged from the regulation flow outlet 54. The balance air is guided to the merging section 56 via the discharge space 66 for the regulation flow path. The balance air merges with the cathode off-gas and the anode exhaust fluid at the merging section 56 and dilutes the exhaust. In this embodiment, since the cross-sectional area of the merging section 56 is larger than any of the cross-sectional areas of the orifice 62, the anode exhaust outlet 52, and the regulation flow outlet 54, the internal pressure in the merging section 56 is kept lower than the others. Therefore, it is possible to prevent the backflow of the exhaust from the merging section 56 to the cathode exhaust outlet 50, the anode exhaust outlet 52, and the regulation flow outlet 54.

Figure 5:
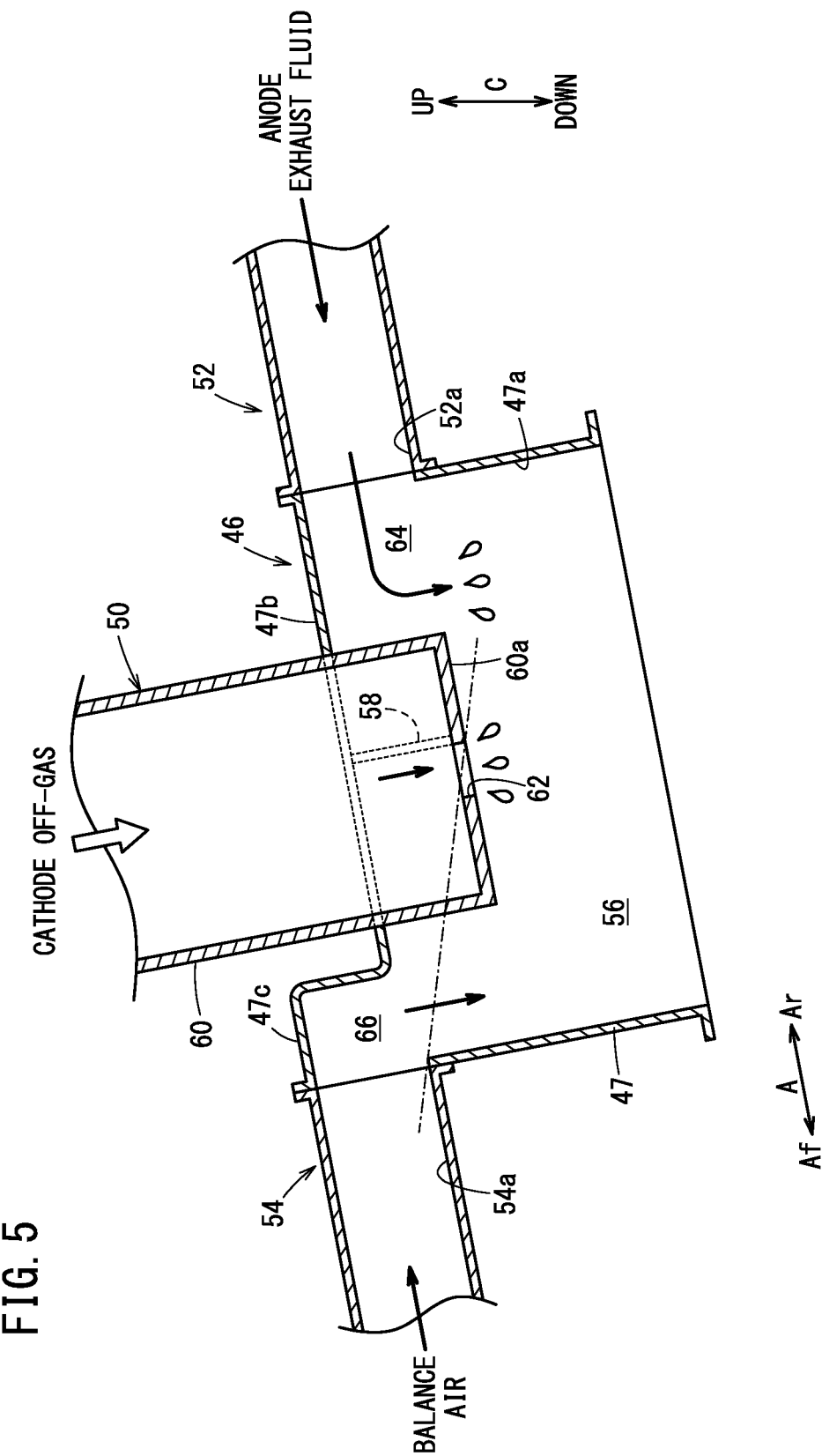
FIG. 5 is an explanatory view showing the operation in a state where the exhaust merging unit shown in FIGS. 2 and 3 is inclined.

Further, in this embodiment, the lower end 54a of the regulation flow outlet 54 is positioned higher than the lower end 58a of the partition 58. In this manner, even when a transportation device (such as a ship, a vehicle, or an aircraft) on which the fuel cell system 10 (see FIG. 1) is installed is inclined as shown in FIG. 5, it is possible to prevent the condensed water from flowing into the regulation flow outlet 54. As a result, it is possible to prevent the deterioration of the function caused by the backflow of the condensed water to the air pump 36, thereby improving the reliability of the fuel cell system 10.

The fuel cell system 10 of the present embodiment has the following effects.

The fuel cell system 10 of the present embodiment including the exhaust merging unit 46 at which the cathode exhaust fluid (e.g., cathode off-gas) containing water discharged from the cathode of the fuel cell stack 12 merges with the anode exhaust fluid containing water discharged from the anode of the fuel cell stack 12. The exhaust merging unit 46 includes the cathode exhaust outlet 50 for discharging the cathode exhaust fluid, the anode exhaust outlet 52 for discharging the anode exhaust fluid, and the partition (including, for example, the tubular portion 60) separating the cathode exhaust outlet 50 and the anode exhaust outlet 52 at the upstream side of the merging section 56 at which the cathode exhaust outlet 50 and the anode exhaust outlet 52 merge.

According to the fuel cell system 10 having the above configuration, it is possible to prevent the backflow of the cathode exhaust fluid into the anode exhaust outlet 52 and the backflow of the anode exhaust fluid into the cathode exhaust outlet 50.

In the fuel cell system 10 described above, the cathode exhaust outlet 50 has the tubular portion 60 extending in the vertical direction and the orifice 62 provided at the lower end 60a of the tubular portion 60, the anode exhaust outlet 52 is arranged lateral to the tubular portion 60, and the cathode exhaust outlet 50 and the anode exhaust outlet 52 may be partitioned by the tubular portion 60. According to the fuel cell system 10 having this configuration, the backflow of the cathode exhaust fluid and the anode exhaust fluid can be prevented.

In the fuel cell system 10, the cross-sectional area of the orifice 62 may be smaller than that of the tubular portion 60. According to the fuel cell system 10 of this configuration, the internal pressure at the tubular portion 60 can be made higher than the internal pressure at the merging section 56, and the backflow of the fluid from the merging section 56 can be prevented.

The fuel cell system 10 may further include the oxygen-containing gas supply device 16 (e.g., an air pump 36) for supplying an oxygen-containing gas (e.g., compressed air) to the fuel cell stack 12, and the regulation flow path 38 for guiding a part of the oxygen-containing gas to the exhaust merging unit 46, wherein the exhaust merging unit 46 is provided with the regulation flow outlet 54 connected to the regulation flow path 38, and the regulation flow outlet 54 and the anode exhaust outlet 52 may be separated by the partition 58. According to the fuel cell system 10 having this configuration, it is possible to prevent the backflow of the anode exhaust fluid into the regulation flow outlet 54. Therefore, it is possible to prevent the condensed water from flowing into the air pump 36.

In the fuel cell system 10 described above, the regulation flow outlet 54 and the anode exhaust outlet 52 may be disposed on opposite sides of the central axis of the exhaust merging unit 46.

In the fuel cell system 10 described above, the lower end 58a of the partition 58 may be formed at the same level as the lower end 60*a* of the tubular portion 60. According to the fuel cell system 10 having this configuration, the regulation flow outlet 54 and the anode exhaust outlet 52 can be separated on the upper side of the merging section 56 inside the exhaust merging unit 46, thereby preventing the condensed water contained in the anode exhaust fluid from flowing into the regulation flow outlet 54.

In the fuel cell system 10 described above, in the exhaust merging unit 46, the regulation flow outlet 54 of the regulation flow path 38 may be positioned higher than the anode exhaust outlet 52. According to the fuel cell system 10 having this configuration, even when the fuel cell system 10 is inclined, the condensed water can be prevented from flowing into the regulation flow outlet 54.

Although preferred embodiments of the present invention have been described above, the present invention is not limited to the above-described embodiments, and various modifications can be made without departing from the gist of the present invention.

What is claimed is:

1. A fuel cell system comprising an exhaust merging unit at which a cathode exhaust fluid containing water discharged from a cathode of a fuel cell stack merges with an anode exhaust fluid containing water discharged from an anode of the fuel cell stack, further comprising
    a cathode exhaust outlet for discharging the cathode exhaust fluid;
    an anode exhaust outlet for discharging the anode exhaust fluid; and
    a partition separating the cathode exhaust outlet and the anode exhaust outlet on an upstream side of a merging section at which the cathode exhaust outlet and the anode exhaust outlet merge,
    wherein the cathode exhaust outlet has an orifice configured to prevent the anode exhaust fluid from flowing into the cathode exhaust outlet.

2. The fuel cell system according to claim 1, wherein the cathode exhaust outlet has a tubular section extending in a vertical direction and the orifice open at a lower end of the tubular section, the anode exhaust outlet is arranged lateral to the tubular section, and the cathode exhaust outlet and the anode exhaust outlet are separated by the tubular section.

3. The fuel cell system according to claim 2, wherein a cross-sectional area of the orifice is smaller than a cross-sectional area of the tubular portion.

4. The fuel cell system according to claim 2, further comprising:
    an oxygen-containing gas supply device for supplying an oxygen-containing gas to the fuel cell stack; and
    a regulation flow path for guiding a part of the oxygen-containing gas from the oxygen-containing gas supply device to the exhaust merging unit;
    wherein a regulation flow outlet connected to the regulation flow path is provided in the exhaust merging unit, and
    the partition separates the regulation flow outlet from the anode exhaust outlet.

5. The fuel cell system according to claim 4, wherein the regulation flow outlet and the anode exhaust outlet are disposed on opposite sides of a central axis of the exhaust merging unit.

6. The fuel cell system according to claim 4, wherein
    a lower end of the partition including the tubular portion extends at a same level.

7. The fuel cell system according to claim 4, wherein in the exhaust merging unit, the regulation flow outlet is positioned higher than the anode exhaust outlet.

8. The fuel cell system according to claim 1, wherein the orifice is configured to reduce a flow of the cathode exhaust fluid so as to prevent the anode exhaust fluid from flowing into the cathode exhaust outlet.

9. The fuel cell system according to claim 1, wherein the orifice is a throttling orifice.

* * * * *